(12) United States Patent
Itokawa et al.

(10) Patent No.: US 12,567,900 B2
(45) Date of Patent: Mar. 3, 2026

(54) WIRELESS COMMUNICATION APPARATUS, WIRELESS COMMUNICATION SYSTEM, WIRELESS COMMUNICATION METHOD AND PROGRAM

(71) Applicant: NTT, Inc., Tokyo (JP)

(72) Inventors: Kiyohiko Itokawa, Musashino (JP);
Yasuyoshi Kojima, Musashino (JP);
Daisuke Goto, Musashino (JP);
Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 324 days.

(21) Appl. No.: 18/268,916

(22) PCT Filed: Dec. 25, 2020

(86) PCT No.: PCT/JP2020/048956
§ 371 (c)(1),
(2) Date: Jun. 21, 2023

(87) PCT Pub. No.: WO2022/137564
PCT Pub. Date: Jun. 30, 2022

(65) Prior Publication Data
US 2024/0063895 A1     Feb. 22, 2024

(51) Int. Cl.
*H04B 7/185*     (2006.01)
*H04W 52/28*     (2009.01)

(52) U.S. Cl.
CPC ........ *H04B 7/18513* (2013.01); *H04W 52/28* (2013.01)

(58) Field of Classification Search
CPC .. H04B 7/18513; H04B 7/0413; H04B 7/185; H04W 52/28; H04W 4/38; H04W 16/28; H04W 52/38; H04W 84/06
See application file for complete search history.

(56) References Cited

U.S. PATENT DOCUMENTS

| | | | |
|---|---|---|---|
| 5,874,913 A | 2/1999 | Blanchard et al. | |
| 2020/0128383 A1* | 4/2020 | Maier | B63B 45/00 |
| 2021/0084480 A1* | 3/2021 | Maier | H04W 4/90 |
| 2022/0190912 A1* | 6/2022 | Jagodits | H04B 7/18523 |

(Continued)

FOREIGN PATENT DOCUMENTS

| | | |
|---|---|---|
| JP | 2001308767 A | 11/2001 |
| JP | 2006197488 A | 7/2006 |

(Continued)

*Primary Examiner* — Abdullahi Ahmed

(57) ABSTRACT

A wireless communication device includes: a transmission unit that transmits a signal to another wireless communication device mounted on a moving object; a timing control unit that starts transmission of the signal by the transmission unit at a timing at which communication with the other wireless communication device is possible; a distance calculation unit that acquires orbit information indicating a geocentric orbit of the moving object and self-position information indicating a self-position to calculate a positional relationship between the self-position and a position of the moving object at the timing based on the orbit information and the self-position information; and an output control unit that controls a transmission output of the signal by the transmission unit according to the positional relationship.

17 Claims, 7 Drawing Sheets

(56) References Cited

U.S. PATENT DOCUMENTS

| 2023/0261737 A1* | 8/2023 | Hirsch | H04B 7/195 |
| | | | 455/12.1 |
| 2023/0261740 A1* | 8/2023 | Hirsch | H04B 7/18513 |
| | | | 370/316 |
| 2023/0275651 A1* | 8/2023 | Hirsch | H04B 7/195 |
| | | | 455/427 |
| 2024/0039619 A1* | 2/2024 | Sakamoto | H04B 7/155 |
| 2024/0214033 A1* | 6/2024 | Sakamoto | H04B 7/185 |
| 2025/0150123 A1* | 5/2025 | Tategami | H04B 17/309 |

FOREIGN PATENT DOCUMENTS

| JP | 2013131930 A | 7/2013 |
| JP | 2014204177 A | 10/2014 |
| JP | 2019047262 A | 3/2019 |

* cited by examiner

WIRELESS COMMUNICATION APPARATUS, WIRELESS COMMUNICATION SYSTEM, WIRELESS COMMUNICATION METHOD AND PROGRAM

CROSS-REFERENCE TO RELATED APPLICATIONS

This application is a 371 National Stage of International Application No. PCT/JP2020/048956, filed on Dec. 25, 2020. The entire disclosure of the above application is incorporated herein by reference.

TECHNICAL FIELD

The present invention relates to a wireless communication apparatus, a wireless communication system, a wireless communication method and a program.

BACKGROUND ART

Internet of Things (IoT) systems that implement various applications by connecting a small terminal device to the Internet have become widespread. As an application example of an IoT system, a system is known in which a plurality of IoT terminals sense environmental information such as air temperature, room temperature, acceleration, and luminous intensity, transmit the environmental information by a radio signal, and collect the environmental information on the cloud side. IoT terminals including various sensors are installed in various places. For example, it is also assumed that IoT is used to collect data of places where it is difficult to install base stations, such as buoys and ships on the sea and in mountainous areas.

On the other hand, there is a wireless system that performs wireless communication between a plurality of communication devices on the ground using a communication satellite, an unmanned aerial vehicle (UAV), or the like as a relay station. As a wireless system using a communication satellite as a relay station, there are a case of using a low earth orbit (LEO) satellite that orbits in a low orbit at an altitude of about 1,000 [km] and a case of using a geostationary orbit (GEO) satellite that orbits at an altitude of 36,000 [km]. A low earth orbit satellite has a shorter propagation distance than a geostationary orbit satellite. Therefore, in a case where a low earth orbit satellite is used as a relay station, it is possible to implement communication with low delay and low propagation loss. Furthermore, in this case, the configuration of the high frequency circuit included in the low earth orbit satellite or the communication device on the ground is facilitated. However, unlike a geostationary orbit satellite, a low earth orbit satellite orbits above the earth, and thus a satellite direction viewed from a communication device on the ground constantly changes. The visible time per orbit of a low earth orbit satellite for each communication device on the ground is about 10 minutes or less. Therefore, a time period in which the low earth orbit satellite and each communication device on the ground can communicate with each other is limited.

On the other hand, low power wide area (LPWA) is known as a wireless system capable of wide-area communication with low power and a low transmission rate suitable for communication of IoT terminals. Recently, a satellite IoT system in which a communication satellite collects data from an IoT terminal using LPWA has been studied. In general, wireless communication between a communication satellite and a communication device on the ground has a longer propagation distance than wireless communication in which direct communication is performed between a plurality of communication devices on the ground. However, LPWA can be applied by using a low earth orbit satellite. In the case of such a satellite IoT system, it is possible to accommodate IoT terminals in the aeronautical field, the marine field, and in rural areas, which are difficult only with normal LPWA. In addition, in this case, since a hub station is not required, service deployment is facilitated.

Meanwhile, power is mainly supplied to a communication device mounted on a communication satellite by a solar cell, and there is a limit to power that can be consumed. In order to solve such a problem, conventionally, a technique for reducing power consumption of a communication device mounted on a communication satellite has been studied (see, for example, Patent Literature 1). Furthermore, in the satellite IoT system, not only a communication device mounted on a communication satellite but also an IoT terminal may be required to have low power consumption. For example, in an IoT terminal used on the sea, in a mountainous area, and the like, miniaturization, weight reduction, and simplification of the device are required, and thus there are cases where the power supply capacity is limited. On the other hand, since long-time driving is required, low power consumption is required.

CITATION LIST

Patent Literature

Patent Literature 1: JP 2001-308767 A

SUMMARY OF INVENTION

Technical Problem

In a satellite IoT system, a transmission output required for transmission of a signal from an IoT terminal to a low earth orbit satellite depends on a distance between the IoT terminal and the low earth orbit satellite. For example, as the distance between the IoT terminal and the low earth orbit satellite is shorter, it is possible to transmit and receive signals with a smaller transmission output. However, in the conventional system, a signal is transmitted with a constant transmission output regardless of the distance between the IoT terminal and the low earth orbit satellite. In general, a signal is transmitted with a transmission output large enough to sufficiently transmit and receive a signal even when the distance between the ground station and the satellite station is long. Therefore, conventionally, when the distance between the IoT terminal and the low earth orbit satellite is short, a signal is transmitted with a transmission output larger than necessary, and there is a problem that power is wastefully consumed.

In view of the above circumstances, an object of the present invention is to provide a wireless communication apparatus, a wireless communication system, a wireless communication method and a program capable of suppressing power consumption.

Solution to Problem

According to an aspect of the present invention, there is provided a wireless communication device including: a transmission unit that transmits a signal to another wireless communication device mounted on a moving object; a timing control unit that starts transmission of the signal by the transmission unit at a timing at which communication with the other wireless communication device is possible; a distance calculation unit that acquires orbit information indicating a geocentric orbit of the moving object and self-position information indicating a self-position to calculate a positional relationship between the self-position and a position of the moving object at the timing based on the orbit information and the self-position information; and an output control unit that controls a transmission output of the signal by the transmission unit according to the positional relationship.

According to another aspect of the present invention, there is provided a wireless communication system including a first wireless communication device, a relay device mounted on a moving object, and a second wireless communication device, in which the first wireless communication device includes: a first signal transmission unit that transmits a first signal to the relay device; a timing control unit that starts transmission of the first signal by the first signal transmission unit at a timing at which communication with the relay device is possible; a distance calculation unit that acquires orbit information indicating a geocentric orbit of the moving object and self-position information indicating a self-position to calculate a positional relationship between the self-position and a position of the moving object at the timing based on the orbit information and the self-position information; and an output control unit that controls a transmission output of the first signal by the first signal transmission unit according to the positional relationship, the relay device includes: a first signal reception unit that receives the first signal transmitted by the first wireless communication device; a storage unit that stores waveform data indicating a waveform of the first signal received by the first signal reception unit; and a second signal transmission unit that transmits a second signal indicating the waveform data stored in the storage unit to the second wireless communication device at a timing at which communication with the second wireless communication device is possible, and the second wireless communication device includes: a second signal reception unit that receives the second signal transmitted by the relay device; a second signal reception processing unit that performs reception processing of the second signal received by the second signal reception unit to acquire the waveform data; and a first signal reception processing unit that performs reception processing of the first signal indicated by the waveform data acquired by the second signal reception processing unit to acquire data set in the first signal by the first wireless communication device.

According to still another aspect of the present invention, there is provided a wireless communication method including: a transmission step of transmitting a signal to another wireless communication device mounted on a moving object; a timing control step of starting transmission of the signal in the transmission step at a timing at which communication with the other wireless communication device is possible; a distance calculation step of acquiring orbit information indicating a geocentric orbit of the moving object and self-position information indicating a self-position to calculate a positional relationship between the self-position and a position of the moving object at the timing based on the orbit information and the self-position information; and an output control step of controlling a transmission output of the signal in the transmission step according to the positional relationship.

According to still another aspect of the present invention, there is provided a wireless communication method that is executed by a wireless communication system including a first wireless communication device, a relay device mounted on a moving object, and a second wireless communication device, the wireless communication method including: a first signal transmission step of transmitting, by the first wireless communication device, a first signal to the relay device; a timing control unit of starting, by the first wireless communication device, transmission of the first signal in the first signal transmission step at a timing at which communication with the relay device is possible; a distance calculation step of acquiring, by the first wireless communication device, orbit information indicating a geocentric orbit of the moving object and self-position information indicating a self-position to calculate a positional relationship between the self-position and a position of the moving object at the timing based on the orbit information and the self-position information; an output control step of controlling, by the first wireless communication device, a transmission output of the first signal in the first signal transmission step according to the positional relationship; a first signal reception step of receiving, by the relay device, the first signal transmitted by the first wireless communication device; a storage step of storing, by the relay device, waveform data indicating a waveform of the first signal received in the first signal reception step; a second signal transmission step of transmitting, by the relay device, a second signal indicating the waveform data stored in the storage step to the second wireless communication device at a timing at which communication with the second wireless communication device is possible; a second signal reception step of receiving, by the second wireless communication device, the second signal transmitted by the relay device; a second signal reception processing step of performing, by the second wireless communication device, reception processing of the second signal received in the second signal reception step to acquire the waveform data; and a first signal reception processing step of performing, by the second wireless communication device, reception processing of the first signal indicated by the waveform data acquired in the second signal reception processing step to acquire data set in the first signal by the first wireless communication device.

According to still another aspect of the present invention, there is provided a program for causing a computer to function as the wireless communication device.

Advantageous Effects of Invention

According to the present invention, power consumption can be suppressed.

DESCRIPTION OF EMBODIMENTS

Embodiments of the present invention will now be described in detail with reference to the drawings.

First Embodiment

Figure 1:
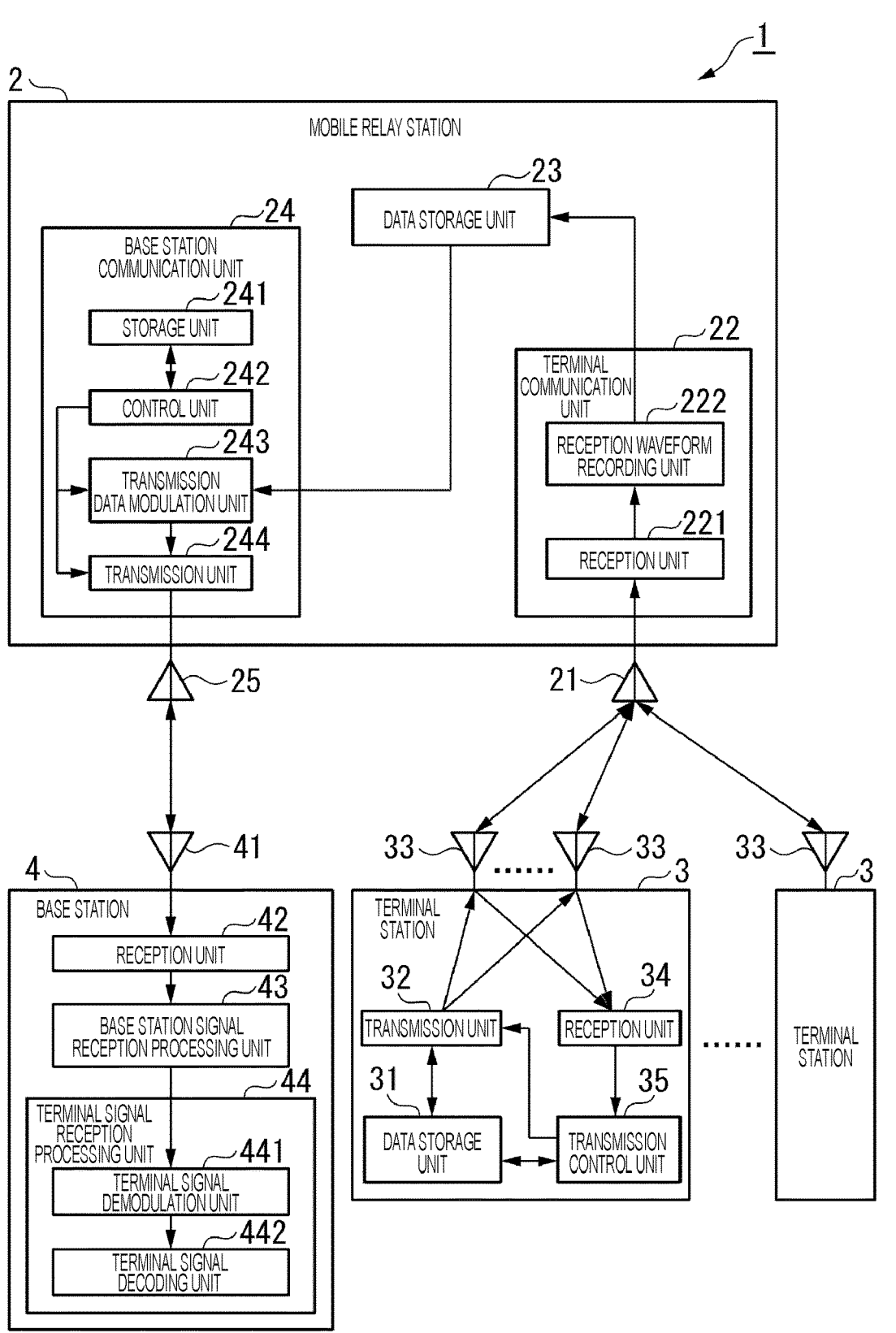
FIG. 1 is a configuration diagram of a wireless communication system according to a first embodiment of the present invention.

FIG. 1 is a configuration diagram of a wireless communication system 1 according to a first embodiment. The wireless communication system 1 includes a mobile relay station 2, a terminal station 3, and a base station 4. The number of mobile relay stations 2, the number of terminal stations 3, and the number of base stations 4 included in the wireless communication system 1 are arbitrary, but it is assumed that the number of terminal stations 3 is large. The wireless communication system 1 is a communication system that transmits information for which immediacy is not required. The information transmitted from each of the plurality of terminal stations 3 is transmitted via the mobile relay station 2 and collected by the base station 4.

The mobile relay station 2 is an example of a relay device that is mounted on a moving object and whose communicable area moves with the elapse of time. The mobile relay station 2 is provided in, for example, a low earth orbit (LEO) satellite. The altitude of the LEO satellite is about 2000 [km] or less, and the LEO satellite orbits the earth in about 1.5 hours per orbit. The terminal station 3 and the base station 4 are installed on the earth such as on the ground or on the sea. The plurality of terminal stations 3 are in different places. The terminal station 3 is, for example, an IoT terminal. The terminal station 3 collects data such as environmental data detected by the sensor and wirelessly transmits the collected data to the mobile relay station 2. In FIG. 1, only two terminal stations 3 are illustrated.

The mobile relay station 2 receives data transmitted from each of the plurality of terminal stations 3 using a radio signal while moving above the earth. The mobile relay station 2 accumulates the received data and collectively wirelessly transmits the accumulated data to the base station 4 at a timing at which communication with the base station 4 is possible. The base station 4 receives the data collected by the terminal station 3 from the mobile relay station 2.

As the mobile relay station 2, it is conceivable to use a relay station mounted on an unmanned aerial vehicle such as a geostationary orbit satellite, a drone, or a high altitude platform station (HAPS). However, in the case of a relay station mounted on a geostationary orbit satellite, although the coverage area (footprint) on the ground is large, the link budget for an IoT terminal installed on the ground is very small due to the high altitude. On the other hand, in the case of a drone or a relay station mounted on an HAPS, although the link budget is high, the coverage area is narrow. Furthermore, the drone requires a battery, and the HAPS requires a battery and a solar panel for charging the battery.

In the present embodiment, the mobile relay station 2 is mounted on the LEO satellite. Thus, in addition to the link budget remaining within limits, LEO satellites orbit outside the atmosphere, and thus have no air resistance and low fuel consumption. In addition, the footprint is also larger than that in a case where a relay station is mounted on a drone or an HAPS.

Since the mobile relay station 2 mounted on the LEO satellite performs communication while moving at a high speed, a time during which each terminal station 3 or the base station 4 can communicate with the mobile relay station 2 is limited. Specifically, when viewed from a terminal station on the ground, the mobile relay station 2 passes through the sky in about 10 minutes or less. In addition, wireless communication schemes of various specifications are used for the terminal stations 3.

Therefore, the mobile relay station 2 receives a terminal uplink signal from the terminal station 3 within the coverage at the current position during movement, and stores waveform data of the received terminal uplink signal. The mobile relay station 2 wirelessly transmits a base station downlink signal in which the waveform data of the terminal uplink signal is set to the base station 4 at a timing when the base station 4 is in the coverage. The base station 4 demodulates the base station downlink signal received from the mobile relay station 2 to obtain waveform data of the terminal uplink signal. The base station 4 demodulates and decodes the terminal uplink signal represented by the waveform data to obtain terminal transmission data which is data transmitted by the terminal station 3.

A configuration of each device will be described.

The mobile relay station 2 includes an antenna 21, a terminal communication unit 22, a data storage unit 23 (a storage), a base station communication unit 24, and an antenna 25.

The terminal communication unit 22 includes a reception unit 221 and a reception waveform recording unit 222. The reception unit 221 receives a terminal uplink signal through the antenna 21. The reception waveform recording unit 222 samples a reception waveform of the terminal uplink signal received by the reception unit 221 and generates waveform data indicating a value obtained by the sampling. The reception waveform recording unit 222 writes, in the data storage unit 23, reception waveform information in which a reception time of the terminal uplink signal in the antenna 21 and the generated waveform data are set. The data storage unit 23 stores the reception waveform information written by the reception waveform recording unit 222.

The base station communication unit 24 transmits the reception waveform information to the base station 4 using a base station downlink signal of an arbitrary wireless communication scheme. The base station communication unit 24 includes a storage unit 241, a control unit 242, a transmission data modulation unit 243, and a transmission unit 244 (a transmitter). The storage unit 241 stores a transmission start timing calculated in advance on the basis of the orbit information of the LEO satellite on which the mobile relay station 2 is mounted and the position of the base station 4. The LEO orbit information is information capable of obtaining the position, speed, movement direction, and the like of the LEO satellite at an arbitrary time. The transmission time may be represented by, for example, an elapsed time from the transmission start timing.

The control unit 242 controls the transmission data modulation unit 243 and the transmission unit 244 to transmit the reception waveform information to the base station 4 at the transmission start timing stored in the storage unit 241. The transmission data modulation unit 243 reads the reception waveform information from the data storage unit 23 as transmission data, and modulates the read transmission data to generate a base station downlink signal. The transmission unit 244 converts the base station downlink signal from an electrical signal into a radio signal, and transmits the radio signal from the antenna 25.

The terminal station 3 includes a data storage unit 31, a transmission unit 32, one or more antennas 33, a reception unit 34, and a transmission control unit 35. The data storage unit 31 stores sensor data and the like. The transmission unit 32 reads the sensor data from the data storage unit 31 as terminal transmission data, and wirelessly transmits a terminal uplink signal to which the read terminal transmission data is set from the antenna 33. The transmission unit 32 transmits a signal by low power wide area (LPWA), for example. LPWA includes LoRaWAN (registered trademark), Sigfox (registered trademark), LTE-M (Long Term Evolution for Machines), NB (Narrow Band)-IoT, and the like, but an arbitrary wireless communication scheme can be used.

Furthermore, the transmission unit 32 may perform transmission with another terminal station 3 by time division multiplexing, orthogonal frequency division multiplexing (OFDM), or the like. The transmission unit 32 determines a channel and a transmission start timing to be used for transmission of a terminal uplink signal by its own station by using a method determined in advance in a wireless communication scheme to be used. In addition, the transmission unit may perform beam formation of signals transmitted from the plurality of antennas 33 by using a method determined in advance in a wireless communication scheme to be used.

The reception unit 34 receives a notification signal transmitted from the mobile relay station 2.

The transmission control unit 35 controls a transmission output of the signal transmitted by the transmission unit 32. A configuration of the signal transmission output control processing by the transmission control unit 35 will be described later.

The base station 4 includes an antenna 41, a reception unit 42, a base station signal reception processing unit 43, and a terminal signal reception processing unit 44. The reception unit 42 converts a terminal downlink signal received by the antenna 41 into an electrical signal. The base station signal reception processing unit 43 demodulates and decodes the reception signal converted into the electrical signal by the reception unit 42 to obtain reception waveform information. The base station signal reception processing unit 43 outputs the reception waveform information to the terminal signal reception processing unit 44.

The terminal signal reception processing unit 44 performs reception processing of the terminal uplink signal indicated by the reception waveform information. At this time, the terminal signal reception processing unit 44 performs reception processing according to the wireless communication scheme used for transmission by the terminal station 3 to acquire terminal transmission data. The terminal signal reception processing unit 44 includes a terminal signal demodulation unit 441 and a terminal signal decoding unit 442.

The terminal signal demodulation unit 441 demodulates the waveform data and outputs a symbol obtained by the demodulation to the terminal signal decoding unit 442. The terminal signal demodulation unit 441 may demodulate the signal indicated by the waveform data after performing processing for compensating for a Doppler shift of the terminal uplink signal received by the antenna 21 of the mobile relay station 2. The Doppler shift received by the terminal uplink signal received by the antenna 21 is calculated in advance on the basis of the position of the terminal station 3 and the orbit information of the LEO on which the mobile relay station 2 is mounted. The terminal signal decoding unit 442 decodes the symbol demodulated by terminal signal demodulation unit 441 to obtain terminal transmission data transmitted from terminal station 3.

Hereinafter, a configuration of signal transmission output control processing by the transmission control unit 35 of the terminal station 3 will be described. The terminal station 3 according to the present embodiment calculates a distance between the mobile relay station 2 to which a signal is to be transmitted and a self-position. The terminal station 3 determines a transmission output of a signal to be transmitted to the mobile relay station 2 on the basis of the calculated distance.

In general, in a satellite IoT system, a transmission output required for transmission of a signal from an IoT terminal to a low earth orbit satellite depends on a distance between the IoT terminal and the low earth orbit satellite. For example, as the distance between the IoT terminal and the low earth orbit satellite is shorter, it is possible to transmit and receive signals with a smaller transmission output. The terminal station 3 according to the present embodiment transmits a signal with a transmission output sufficient for transmitting the signal to the mobile relay station 2 and with a smaller transmission output. Accordingly, the terminal station 3 according to the present embodiment can suppress power consumption.

Figure 2:
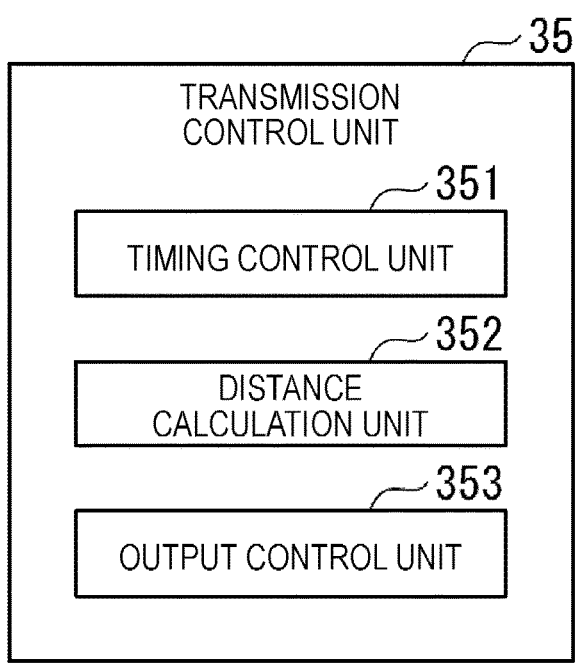
FIG. 2 is a block diagram illustrating a functional configuration of a transmission control unit of a terminal station according to the first embodiment.
Figure 3:
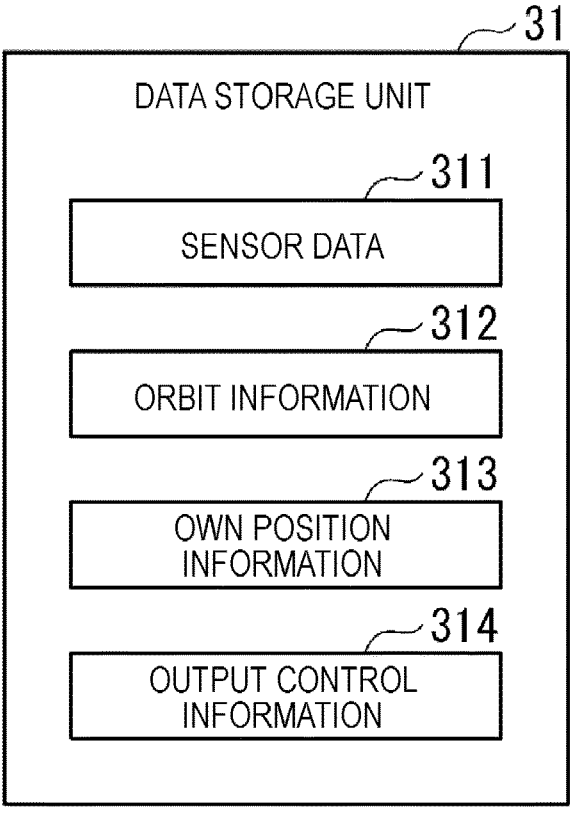
FIG. 3 is a block diagram schematically illustrating a data storage unit of the terminal station according to the first embodiment.

FIG. 2 is a block diagram illustrating a functional configuration of the transmission control unit 35 of the terminal station 3 according to the first embodiment. FIG. 3 is a block diagram illustrating a configuration of the data storage unit 31 of the terminal station 3 according to the first embodiment.

As illustrated in FIG. 2, the transmission control unit 35 includes a timing control unit 351 (a timing controller), a distance calculation unit 352 (distance calculator), and an output control unit 353 (an output controller). In addition, as illustrated in FIG. 3, the data storage unit 31 stores sensor data 311, orbit information 312, self-position information 313, and output control information 314.

The sensor data 311 is data generated by the IoT terminal having the terminal station 3 and transmitted from the terminal station 3 to the mobile relay station 2. The sensor data 311 is, for example, environmental data indicating temperature, humidity, power flow, or the like around the IoT terminal having the terminal station 3.

The orbit information 312 is information indicating the orbit of the low earth orbit satellite on which the mobile relay station 2 is mounted. The orbit information 312 is, for example, information indicating which low earth orbit satellite is present at which time and at which position.

The self-position information 313 is information indicating the position of its own terminal station 3. Note that, in a case where the IoT terminal having the terminal station 3 is a device that moves with time, the self-position information 313 is updated at any time. In this case, for example, a positioning system such as a GPS is mounted on the terminal station 3, and the self-position information 313 is updated by position information measured by the positioning system at any time.

The output control information 314 is information in which a distance between the mobile relay station 2 and the terminal station 3 is associated with a signal transmission output. For example, the output control information 314 is a function that outputs information indicating a signal transmission output when information indicating a distance is input. Alternatively, the output control information 314 may be a table in which information indicating a distance and information indicating a signal transmission output are associated with each other.

The timing control unit 351 reads the orbit information 312 and the self-position information 313 from the data storage unit 31. The timing control unit 351 determines a timing at which the transmission unit 32 transmits a signal based on the sensor data 311 to the mobile relay station 2 (hereinafter referred to as a "transmission start timing") on the basis of the orbit information 312 and the self-position information 313. The transmission start timing is, for example, a transmission time of a signal based on the sensor data 311. The timing control unit 351 records transmission start timing information indicating the determined transmission start timing in the data storage unit 31.

The distance calculation unit 352 acquires the transmission start timing information recorded in the data storage unit 31. The distance calculation unit 352 reads the orbit information 312 and the self-position information 313 from the data storage unit 31. The distance calculation unit 352 specifies the position of the mobile relay station 2 at the transmission start timing on the basis of the transmission start timing information and the orbit information 312. The distance calculation unit 352 calculates the distance between the mobile relay station 2 and its own terminal station 3 at the transmission start timing on the basis of the specified position of the mobile relay station 2 and the self-position indicated by the self-position information 313. The distance calculation unit 352 records information indicating the calculated distance (hereinafter referred to as "distance information") in the data storage unit 31.

The output control unit 353 acquires distance information from the data storage unit 31. The output control unit 353 reads the output control information 314 from the data storage unit 31. The output control unit 353 determines the transmission output of a signal by the transmission unit 32 on the basis of the distance information and the output control information 314. The output control unit 353 records transmission output information indicating the determined transmission output in the data storage unit 31. The output control unit 353 reads the transmission output information recorded in the data storage unit 31 before the transmission start timing. The output control unit 353 controls the transmission unit 32 so that a signal is transmitted to the mobile relay station 2 with a transmission output based on the transmission output information at the transmission start timing.

An operation of the wireless communication system 1 will be described.

Figure 4:
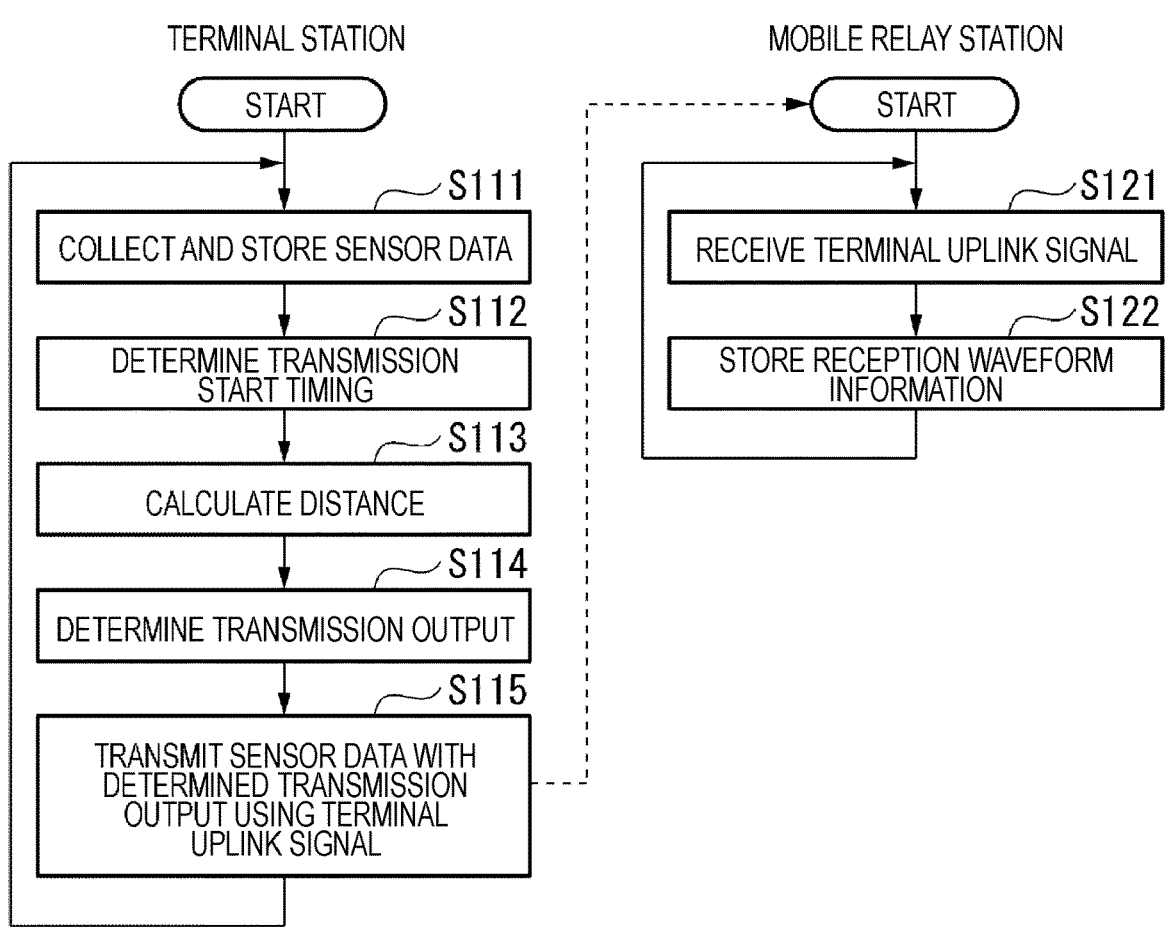
FIG. 4 is a flowchart illustrating processing of the wireless communication system according to the first embodiment.

FIG. 4 is a flowchart illustrating processing of the wireless communication system 1 in a case where a terminal uplink signal is transmitted from the terminal station 3. The terminal station 3 acquires data detected by a sensor (not illustrated) provided outside or inside at any time, and writes the acquired data in the data storage unit 31 as the sensor data 311 (step S111).

The timing control unit 351 reads the orbit information 312 and the self-position information 313 from the data storage unit 31. The timing control unit 351 determines the transmission start timing on the basis of the orbit information 312 and the self-position information 313 (step S112). The timing control unit 351 records transmission start timing information indicating the determined transmission start timing in the data storage unit 31.

The distance calculation unit 352 acquires the transmission start timing information recorded in the data storage unit 31. The distance calculation unit 352 reads the orbit information 312 and the self-position information 313 from the data storage unit 31. The distance calculation unit 352 specifies the position of the mobile relay station 2 at the transmission start timing on the basis of the transmission start timing information and the orbit information 312. The distance calculation unit 352 calculates the distance between the mobile relay station 2 and its own terminal station 3 at the transmission start timing on the basis of the specified position of the mobile relay station 2 and the self-position indicated by the self-position information 313 (step S113). The distance calculation unit 352 records distance information indicating the calculated distance in the data storage unit 31.

The output control unit 353 acquires distance information from the data storage unit 31. The output control unit 353 reads the output control information 314 from the data storage unit 31. The output control unit 353 determines the transmission output of a signal by the transmission unit 32 on the basis of the distance information and the output control information 314 (step S114). The output control unit 353 records transmission output information indicating the determined transmission output in the data storage unit 31. The output control unit 353 reads the transmission output information recorded in the data storage unit 31 before transmission start timing. The output control unit 353 controls the transmission unit 32 so that a signal is transmitted to the mobile relay station 2 with the determined transmission output at the transmission start timing.

The transmission unit 32 reads the sensor data 311 from the data storage unit 31 as terminal transmission data. The transmission unit 32 wirelessly transmits the terminal uplink signal in which the terminal transmission data is set from the antenna 33 at the transmission start timing determined by the timing control unit 351 in step S112. At this time, the transmission unit 32 wirelessly transmits the terminal uplink signal with the transmission output determined by the output control unit 353 in step S114 (step S115). The terminal station 3 repeats processing from step S111.

The reception unit 221 of the mobile relay station 2 receives the terminal uplink signal transmitted from the terminal station 3 (step S121). Depending on the wireless communication scheme of the terminal station 3 of the transmission source, there are a case where the terminal uplink signal is received from only one terminal station 3 in a time division manner at the same frequency and a case where the terminal uplink signals are simultaneously received from a plurality of terminal stations 3 at the same frequency. The reception waveform recording unit 222 writes, in the data storage unit 23, reception waveform information in which waveform data representing a waveform of the terminal uplink signal received by the reception unit 221 and a reception time are associated with each other (step S122). The mobile relay station 2 repeats processing from step S121.

Figure 5:
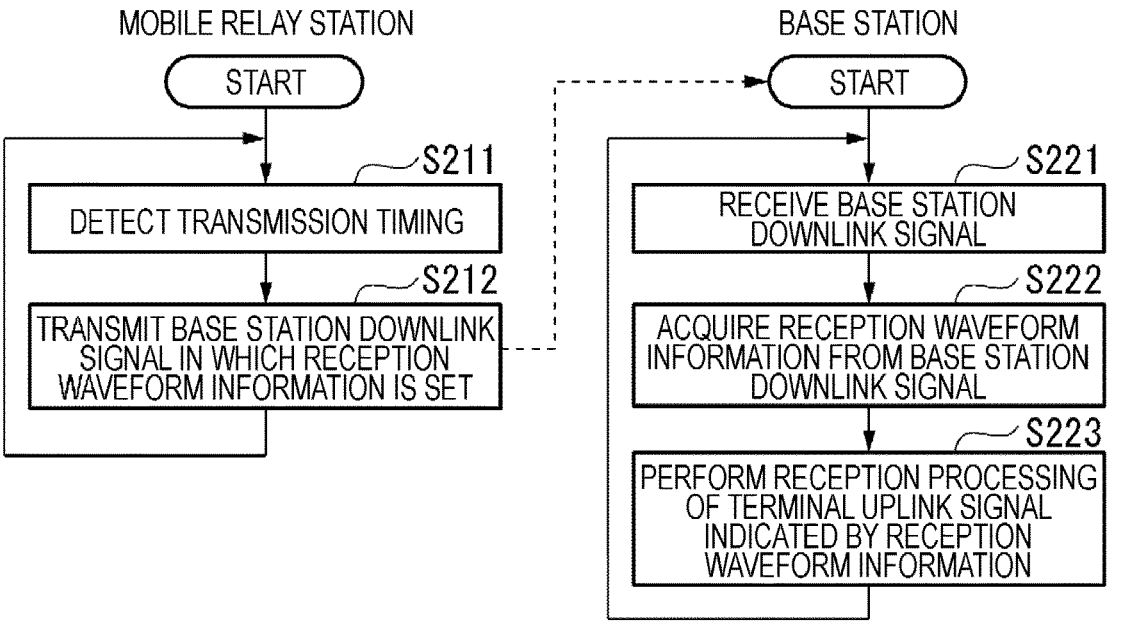
FIG. 5 is a flowchart illustrating processing of the wireless communication system according to the first embodiment.

FIG. 5 is a flowchart illustrating processing of the wireless communication system 1 in a case where a base station downlink signal is transmitted from the mobile relay station 2. When detecting that it is the transmission start timing stored in the storage unit 241, the control unit 242 included in the base station communication unit 24 of the mobile relay station 2 instructs the transmission data modulation unit 243 and the transmission unit 244 to transmit the reception waveform information (step S211). The transmission data modulation unit 243 reads the reception waveform information accumulated in the data storage unit 23 as transmission data, modulates the read transmission data, and generates a base station downlink signal. The transmission unit 244 wirelessly transmits the base station downlink signal generated by the transmission data modulation unit 243 from the antenna 25 (step S212). The mobile relay station 2 repeats processing from step S211.

The antenna 41 of the base station 4 receives the base station downlink signal from the mobile relay station 2 (step S221). The reception unit 42 converts the base station downlink signal received by the antenna 41 into a reception signal of an electrical signal and outputs the reception signal to the base station signal reception processing unit 43. The base station signal reception processing unit 43 demodulates the reception signal and decodes the demodulated reception signal (step S222). The base station signal reception processing unit 43 outputs the reception waveform information obtained by the decoding to the terminal signal reception processing unit 44.

The terminal signal reception processing unit 44 performs reception processing of the terminal uplink signal represented by the waveform data included in the reception waveform information (step S223). Specifically, the terminal signal demodulation unit 441 specifies the wireless communication scheme used by the terminal station 3 to transmit the terminal uplink signal on the basis of the information specific to the wireless communication scheme included in the reception signal represented by the waveform data. The terminal signal demodulation unit 441 demodulates the reception signal represented by the waveform data according to the specified wireless communication scheme, and outputs a symbol obtained by the demodulation to the terminal signal decoding unit 442. The terminal signal decoding unit 442 decodes the symbol input from the terminal signal demodulation unit 441 using the specified wireless communication scheme, and obtains terminal transmission data transmitted from the terminal station 3. Note that the terminal signal decoding unit 442 can also use a decoding scheme with a large calculation load, such as successive interference cancellation (SIC). The base station 4 repeats processing from step S221.

As described above, the terminal station 3 according to the present embodiment calculates the distance between the mobile relay station 2 to which a signal is to be transmitted and a self-position at the signal transmission start timing. The terminal station 3 determines a transmission output of a signal to be transmitted to the mobile relay station 2 on the basis of the calculated distance. As described above, in general, in a satellite IoT system, a transmission output required for transmission of a signal from an IoT terminal to a low earth orbit satellite depends on a distance between the IoT terminal and the low earth orbit satellite. The terminal station 3 according to the present embodiment transmits a signal with a transmission output sufficient for transmitting the signal to the mobile relay station 2 and with a smaller transmission output. Accordingly, even when the distance between the mobile relay station 2 and the self-position is short, for example, the terminal station 3 does not transmit a signal with a transmission output larger than necessary, and thus power is not wastefully consumed. Therefore, the terminal station 3 according to the present embodiment can suppress power consumption.

Second Embodiment

In the present embodiment, the mobile relay station transmits base station downlink signals through a plurality of antennas. Hereinafter, differences from the first embodiment will be mainly described by using a case where multiple input multiple output (MIMO) is used to transmit the base station downlink signals as an example.

Figure 6:
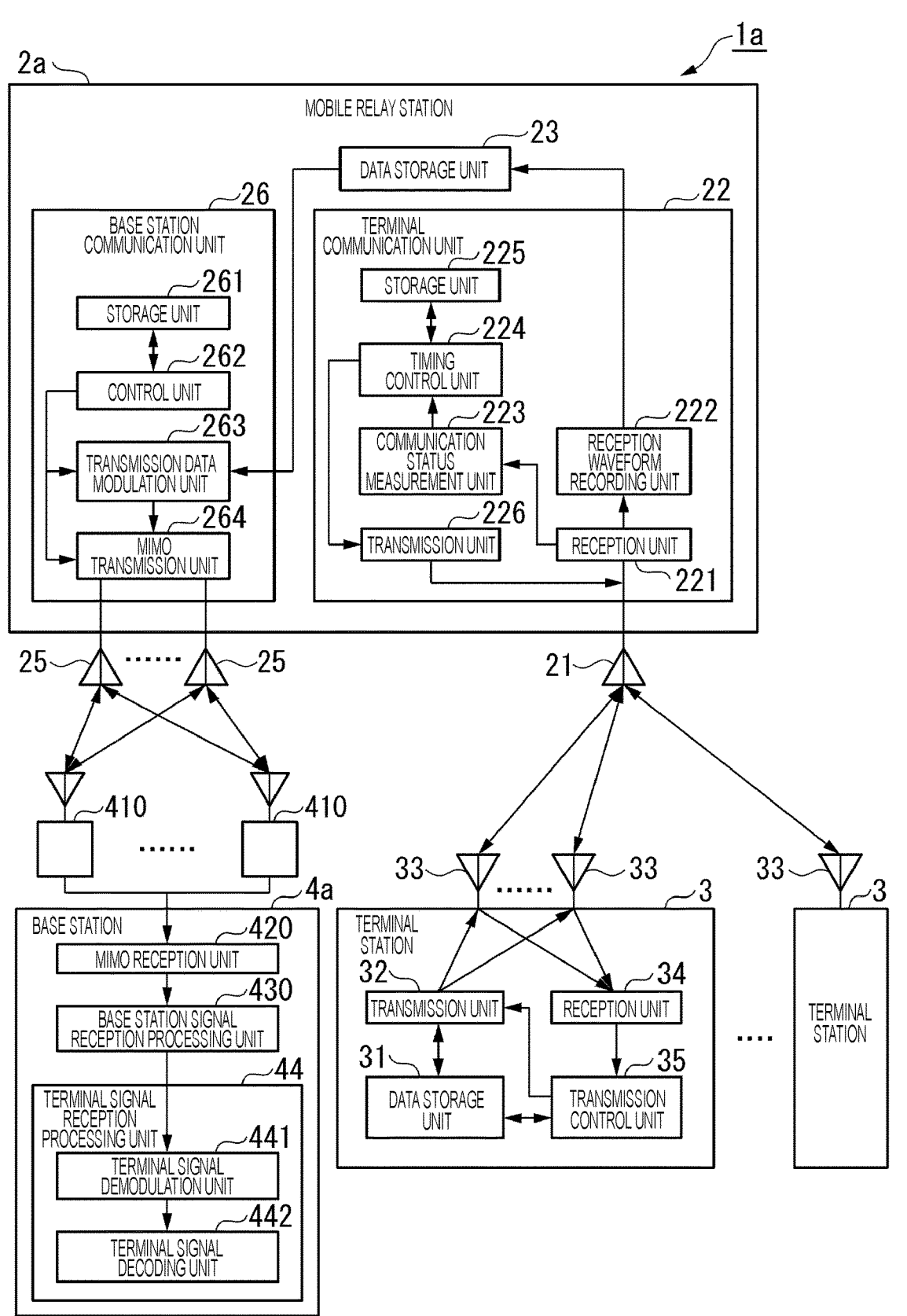
FIG. 6 is a configuration diagram of a wireless communication system according to a second embodiment.

FIG. 6 is a configuration diagram of a wireless communication system 1a according to a second embodiment. In FIG. 6, the same components as those of the wireless communication system 1 according to the first embodiment illustrated in FIG. 1 are denoted by the same reference numerals as those used in FIG. 1, and description thereof will be omitted. The wireless communication system 1a includes a mobile relay station 2a, a terminal station 3, and a base station 4a.

The mobile relay station 2a includes an antenna 21, a terminal communication unit 22, a data storage unit 23, a base station communication unit 26, and a plurality of antennas 25. The base station communication unit 26 transmits reception waveform information to the base station 4a by MIMO. The base station communication unit 26 includes a storage unit 261, a control unit 262, a transmission data modulation unit 263, and a MIMO transmission unit 264. The storage unit 261 stores a transmission start timing calculated in advance on the basis of the orbit information of the LEO satellite on which the mobile relay station 2a is mounted and the position of the base station 4a. Furthermore, the storage unit 261 stores in advance a weight for each transmission time of the base station downlink signal transmitted from each antenna 25. The weight for each transmission time is calculated on the basis of the orbit information of the LEO satellite and the position of each antenna station 410 included in the base station 4a. Note that a constant weight may be used regardless of the transmission time.

The control unit 262 controls the transmission data modulation unit 263 and the MIMO transmission unit 264 to transmit the reception waveform information to the base station 4a at the transmission start timing stored in the storage unit 261. Furthermore, the control unit 262 instructs the MIMO transmission unit 264 on the weight for each transmission time read from the storage unit 261. The transmission data modulation unit 263 reads the reception waveform information from the data storage unit 23 as transmission data, converts the read transmission data into a parallel signal, and then modulates the parallel signal. The MIMO transmission unit 264 weights the modulated parallel signal by the weight instructed from the control unit 262, and generates the base station downlink signal transmitted from each antenna 25. The MIMO transmission unit 264 transmits the generated base station downlink signal from the antenna 25 by MIMO.

The base station 4a includes a plurality of antenna stations 410, a MIMO reception unit 420, a base station signal reception processing unit 430, and a terminal signal reception processing unit 44. The antenna station 410 is disposed at a position away from the other antenna stations 410 so that an arrival angle difference of signals from each of the plurality of antennas 25 of the mobile relay station 2a increases. Each antenna station 410 converts the base station downlink signal received from the mobile relay station 2a into an electrical signal and outputs the electrical signal to the MIMO reception unit 420.

The MIMO reception unit 420 aggregates the base station downlink signals received from the plurality of antenna stations 410. The MIMO reception unit 420 stores a weight for each reception time for the base station downlink signal received by each of the antenna stations 410 on the basis of the orbit information of the LEO satellite and the position of each of the antenna stations 410. The MIMO reception unit 420 multiplies the base station downlink signal input from each antenna station 410 by a weight corresponding to the reception time of the base station downlink signal and combines the reception signals multiplied by the weight. Note that the same weight may be used regardless of the reception time. The base station signal reception processing unit 430 demodulates and decodes the combined reception signal to obtain reception waveform information. The base station signal reception processing unit 430 outputs the reception waveform information to the terminal signal reception processing unit 44.

An operation of the wireless communication system 1*a* will be described.

The processing of the wireless communication system 1*a* in a case where the terminal uplink signal is transmitted from the terminal station 3 is similar to the processing of the wireless communication system 1 of the first embodiment illustrated in FIG. 4.

Figure 7:
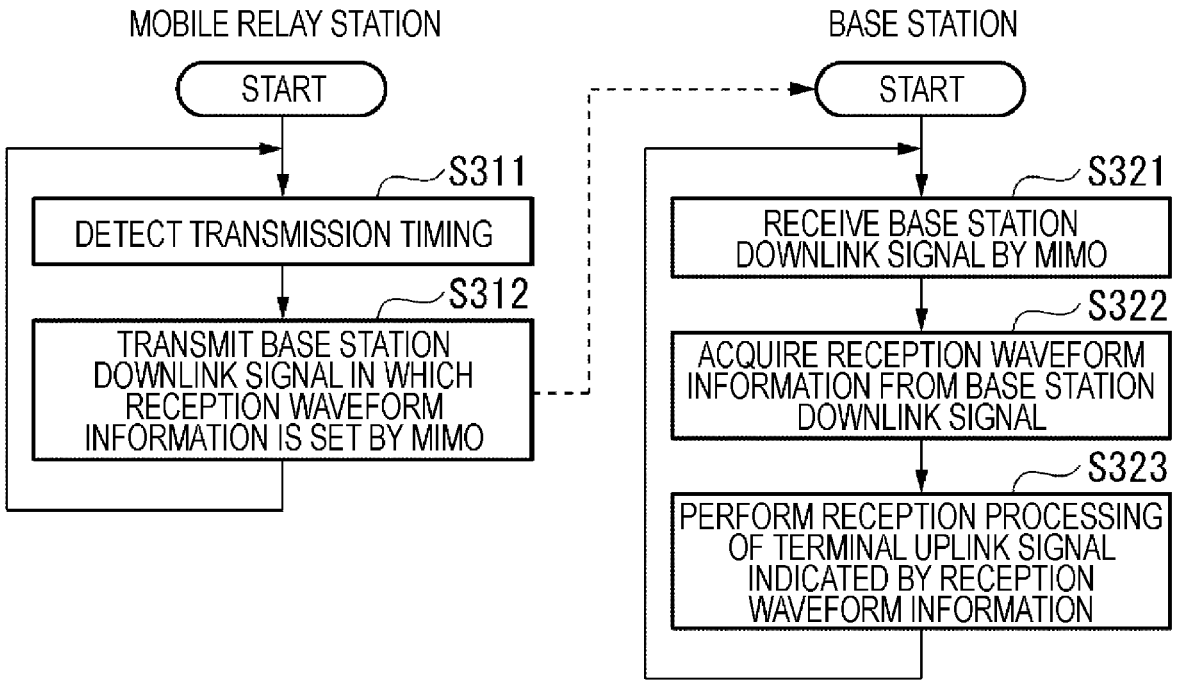
FIG. 7 is a flowchart illustrating processing of the wireless communication system according to the second embodiment.

FIG. 7 is a flowchart illustrating processing of the wireless communication system 1*a* in a case where a base station downlink signal is transmitted from the mobile relay station 2*a*. When detecting that it is the transmission start timing stored in the storage unit 261, the control unit 262 included in the base station communication unit 26 of the mobile relay station 2*a* instructs the transmission data modulation unit 263 and the MIMO transmission unit 264 to transmit the reception waveform information (step S311).

The transmission data modulation unit 263 reads the reception waveform information accumulated in the data storage unit 23 as transmission data, performs parallel conversion on the read transmission data, and then modulates the transmission data. The MIMO transmission unit 264 weights the transmission data modulated by the transmission data modulation unit 263 by the weight instructed from the control unit 262 and generates a base station downlink signal which is a transmission signal transmitted from each antenna 25. The MIMO transmission unit 264 transmits each generated base station downlink signal from the antenna 25 by MIMO (step S312). The mobile relay station 2*a* repeats processing from step S311.

Each antenna station 410 of the base station 4*a* receives a base station downlink signal from the mobile relay station 2*a* (step S321). Each antenna station 410 outputs a reception signal obtained by converting the received base station downlink signal into an electrical signal to the MIMO reception unit 420. The MIMO reception unit 420 synchronizes the timing of the reception signal received from each antenna station 410. The MIMO reception unit 420 multiplies and adds the weight to the reception signal received by each antenna station 410. The base station signal reception processing unit 430 demodulates the added reception signal and decodes the demodulated reception signal (step S322). The base station signal reception processing unit 430 outputs the reception waveform information obtained by the decoding to the terminal signal reception processing unit 44.

The terminal signal reception processing unit 44 performs reception processing of the terminal uplink signal represented by the waveform data included in the reception waveform information by processing similar to step S223 in the processing flow of the first embodiment illustrated in FIG. 5 (step S323). That is, the terminal signal demodulation unit 441 specifies the wireless communication scheme used by the terminal station 3 to transmit the terminal uplink signal on the basis of the information specific to the wireless communication scheme included in the reception signal represented by the waveform data. The terminal signal demodulation unit 441 demodulates the reception signal represented by the waveform data according to the specified wireless communication scheme, and outputs a symbol obtained by the demodulation to the terminal signal decoding unit 442. The terminal signal decoding unit 442 decodes the symbol input from the terminal signal demodulation unit 441 using the specified wireless communication scheme and obtains terminal transmission data transmitted from the terminal station 3. Note that the terminal signal decoding unit 442 can also use a decoding scheme with a large calculation load, such as SIC. The base station 4*a* repeats processing from step S321.

As described above, the terminal station 3 according to the present embodiment calculates the distance between the mobile relay station 2*a* to which a signal is to be transmitted and a self-position at the signal transmission start timing. The terminal station 3 determines a transmission output of a signal to be transmitted to the mobile relay station 2*a* on the basis of the calculated distance. As described above, in general, in a satellite IoT system, a transmission output required for transmission of a signal from an IoT terminal to a low earth orbit satellite depends on a distance between the IoT terminal and the low earth orbit satellite. The terminal station 3 according to the present embodiment transmits a signal with a transmission output sufficient for transmitting the signal to the mobile relay station 2*a* and with a smaller transmission output. Accordingly, even when the distance between the mobile relay station 2*a* and a self-position is short, for example, the terminal station 3 does not transmit a signal with a transmission output larger than necessary, and thus power is not wastefully consumed. Therefore, the terminal station 3 according to the present embodiment can suppress power consumption.

Furthermore, according to the above-described embodiments, the mobile relay station can collectively transmit the data received and accumulated from the plurality of terminal stations with high quality in a short time at a timing at which communication with the base station is possible.

Third Embodiment

In the present embodiment, the mobile relay station receives terminal uplink signals through a plurality of antennas. Differences from the second embodiment will be mainly described below.

Figure 8:
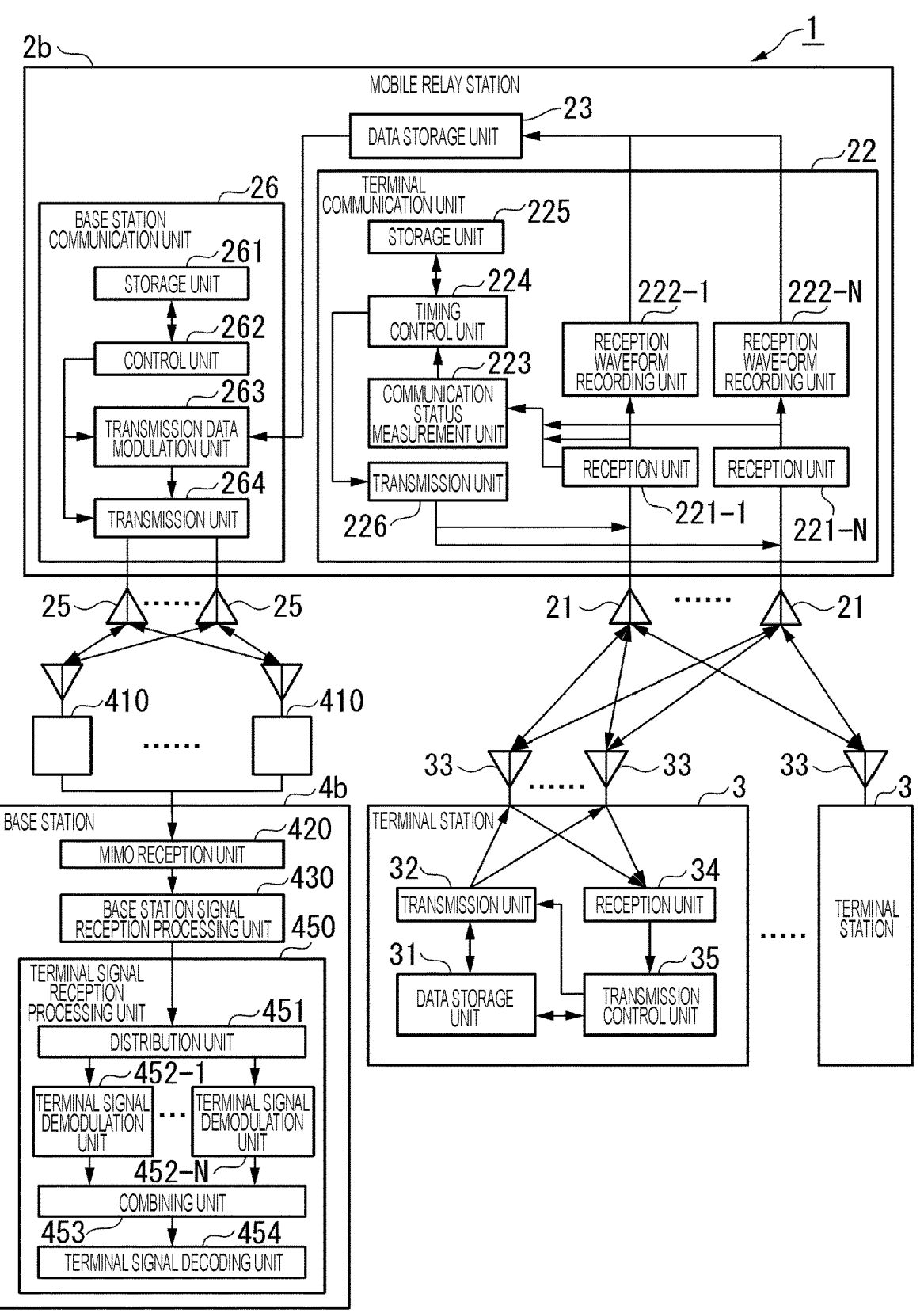
FIG. 8 is a configuration diagram of a wireless communication system according to a third embodiment.

FIG. 8 is a configuration diagram of a wireless communication system 1*b* according to a third embodiment. In FIG. 8, the same components as those of the wireless communication system 1*a* according to the second embodiment illustrated in FIG. 6 are denoted by the same reference numerals as those used in FIG. 6, and description thereof will be omitted. The wireless communication system 1*b* includes a mobile relay station 2*b*, a terminal station 3, and a base station 4*b*.

The mobile relay station 2*b* includes N antennas 21 (N is an integer of 2 or more), a terminal communication unit 22*b*, a data storage unit 23, a base station communication unit 26, and a plurality of antennas 25. The N antennas 21 are referred to as antennas 21-1 to 21-N, respectively.

The terminal communication unit 22*b* includes N reception units 221*b* and N reception waveform recording units 222*b*. The N reception units 221*b* are referred to as reception units 221*b*-1 to 221*b*-N, and the N reception waveform recording units 222*b* are referred to as reception waveform recording units 222*b*-1 to 222*b*-N. The reception unit 221*b*-*n* (*n* is an integer from 1 to N) receives the terminal uplink signal through the antenna 21-*n*.

The reception waveform recording unit 222*b*-*n* samples a reception waveform of the terminal uplink signal received by the reception unit 221*b-n* and generates waveform data indicating a value obtained by the sampling. The reception waveform recording unit 222*b-n* writes, in the data storage unit 23, reception waveform information in which an antenna identifier of the antenna 21-*n*, a reception time of the terminal uplink signal at the antenna 21-*n*, and the generated waveform data are set. The antenna identifier is information for specifying the antenna 21-*n*. The data storage unit 23 stores reception waveform information including waveform data of the terminal uplink signal received by each of the antennas 21-1 to 21-N.

The base station 4*b* includes a plurality of antenna stations 410, a MIMO reception unit 420, a base station signal reception processing unit 430, and a terminal signal reception processing unit 450.

The terminal signal reception processing unit 450 performs reception processing of the terminal uplink signal indicated by the reception waveform information. At this time, the terminal signal reception processing unit 450 performs reception processing according to the wireless communication scheme used for transmission by the terminal station 3 to acquire terminal transmission data. The terminal signal reception processing unit 450 includes a distribution unit 451, N terminal signal demodulation units 452, a combining unit 453, and a terminal signal decoding unit 454. The N terminal signal demodulation units 452 are referred to as terminal signal demodulation units 452-1 to 452-N, respectively.

The distribution unit 451 reads the waveform data having the same reception time from the reception waveform information and outputs the read waveform data to the terminal signal demodulation units 452-1 to 452-N according to the antenna identifier associated with the waveform data. That is, the distribution unit 451 outputs the waveform data associated with the antenna identifier of the antenna 21-*n* to the terminal signal demodulation unit 452-*n*.

Each of the terminal signal demodulation units 452-1 to 452-N demodulates a signal represented by the waveform data and outputs a symbol obtained by the demodulation to the combining unit 453. The terminal signal demodulation unit 452-*n* may demodulate the signal represented by the waveform data after performing processing for compensating for the Doppler shift of the terminal uplink signal received by the antenna 21-*n* of the mobile relay station 2. The Doppler shift received by the terminal uplink signal received by each antenna 21-*n* is calculated in advance on the basis of the position of the terminal station 3 and the orbit information of the LEO on which the mobile relay station 2*b* is mounted.

The combining unit 453 adds and combines the symbols input from the terminal signal demodulation units 452-1 to 452-N, and outputs the result to the terminal signal decoding unit 454. The terminal signal decoding unit 454 decodes the added and combined symbol to obtain terminal transmission data transmitted from the terminal station 3.

An operation of the wireless communication system 1*b* will be described.

Figure 9:
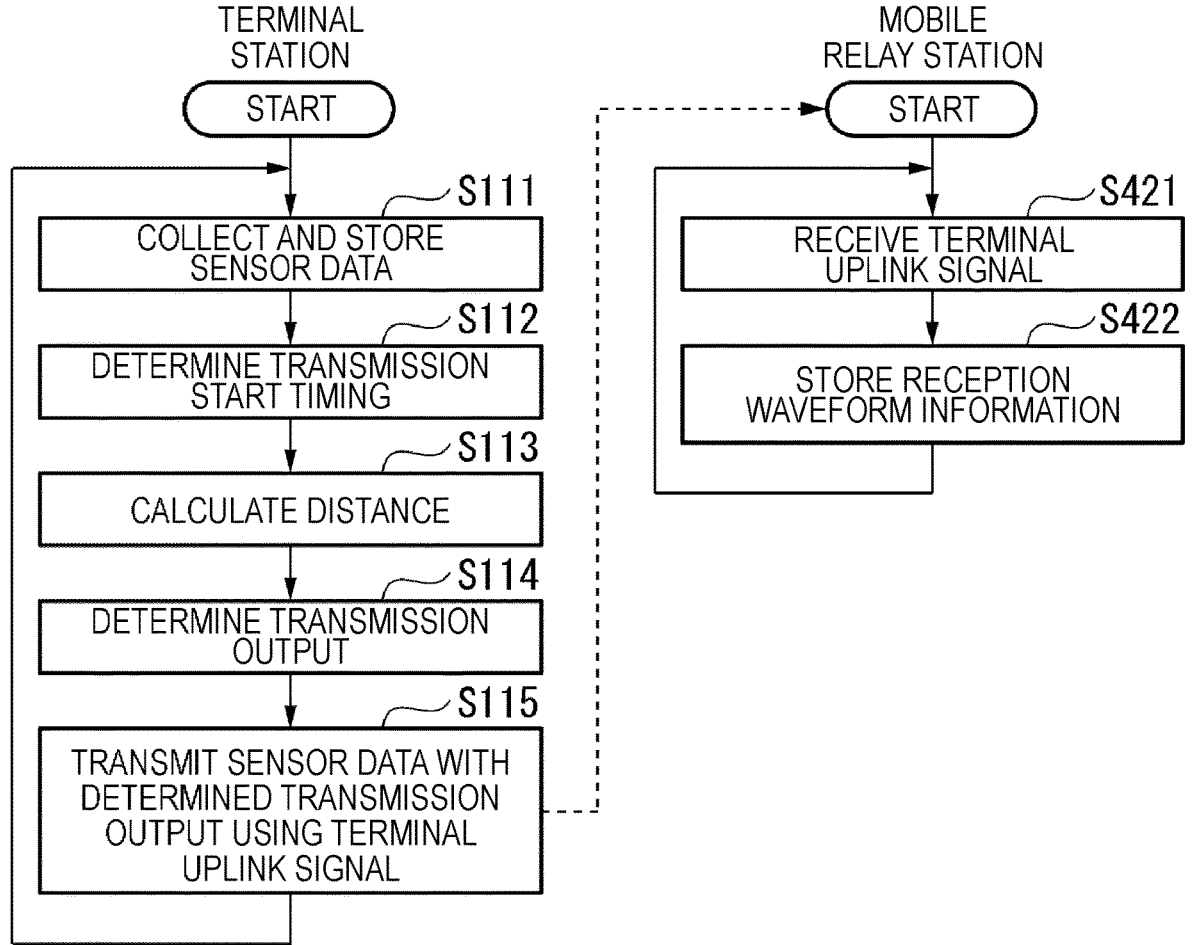
FIG. 9 is a flowchart illustrating processing of the wireless communication system according to the third embodiment.

FIG. 9 is a flowchart illustrating processing of the wireless communication system 1*b* in a case where a terminal uplink signal is transmitted from the terminal station 3. In FIG. 9, the same processes as the processing flow of the first embodiment illustrated in FIG. 4 are denoted by the same reference numerals as those used in FIG. 4. The terminal station 3 performs processing similar to the processing of steps S111 to S115 in the processing flow of the first embodiment illustrated in FIG. 4. Note that the terminal station 3 may perform transmission with another terminal station 3 by time division multiplexing, OFDM, MIMO, or the like.

The reception units 221*b*-1 to 221*b*-N of the mobile relay station 2*b* receive the terminal uplink signal transmitted from the terminal station 3 (step S421). Depending on the wireless communication scheme of the terminal station 3 of the transmission source, there are a case where the terminal uplink signal is received from only one terminal station 3 in a time division manner at the same frequency and a case where the terminal uplink signals are simultaneously received from a plurality of terminal stations 3 at the same frequency.

The reception waveform recording unit 222*b-n* writes, in the data storage unit 23, the reception waveform information in which the waveform data representing the waveform of the terminal uplink signal received by the reception unit 221*b-n*, the reception time, and the antenna identifier of the antenna 21-*n* are associated with each other (step S422). The mobile relay station 2*b* repeats processing from step S421.

The processing of the wireless communication system 1*b* in the case of transmitting the base station downlink signal from the mobile relay station 2*b* is similar to the processing flow of the second embodiment illustrated in FIG. 7 except for the following processing. That is, in step S323, the terminal signal reception processing unit 450 performs reception processing of the terminal uplink signal indicated by the reception waveform information.

Specifically, the distribution unit 451 reads waveform data having the same reception time from the reception waveform information and outputs the read waveform data to the terminal signal demodulation units 452-1 to 452-N according to the antenna identifier associated with the waveform data. Each of the terminal signal demodulation unit 452-1 to 452-N specifies the wireless communication scheme used by the terminal station 3 to transmit the terminal uplink signal on the basis of the information specific to the wireless communication scheme included in the reception signal represented by the waveform data. The terminal signal demodulation units 452-1 to 452-N demodulate the reception signals represented by the waveform data according to the specified wireless communication scheme and output symbols obtained by the demodulation to the combining unit 453.

The combining unit 453 adds and combines the symbols input from the terminal signal demodulation units 452-1 to 452-N. By the addition and combination, the signal transmitted by the terminal station 3 is emphasized because of the correlation, but the influence of the randomly added noise is reduced. Therefore, the diversity effect can be obtained for the terminal uplink signal that the mobile relay station 2*b* simultaneously receives from only one terminal station 3. In addition, terminal uplink signals simultaneously received by the mobile relay station 2*b* from a plurality of terminal stations 3 correspond to performing MIMO communication. The combining unit 453 outputs the added and combined symbol to the terminal signal decoding unit 454.

The terminal signal decoding unit 454 decodes the symbol added and combined by the combining unit 453 by the specified wireless communication scheme to obtain terminal transmission data transmitted from the terminal station 3. Note that the terminal signal decoding unit 454 can also use a decoding scheme with a large calculation load, such as SIC.

As described above, the terminal station 3 according to the present embodiment calculates the distance between the mobile relay station 2*b* to which a signal is to be transmitted and a self-position at the signal transmission start timing. The terminal station 3 determines a transmission output of a signal to be transmitted to the mobile relay station 2*b* on the basis of the calculated distance. As described above, in general, in a satellite IoT system, a transmission output required for transmission of a signal from an IoT terminal to a low earth orbit satellite depends on a distance between the IoT terminal and the low earth orbit satellite. The terminal station 3 according to the present embodiment transmits a signal with a transmission output sufficient for transmitting the signal to the mobile relay station 2*b* and with a smaller transmission output. Accordingly, even when the distance between the mobile relay station 2*b* and a self-position is short, for example, the terminal station 3 does not transmit a signal with a transmission output larger than necessary, and thus power is not wastefully consumed. Therefore, the terminal station 3 according to the present embodiment can suppress power consumption.

Furthermore, according to the above-described embodiments, the mobile relay station receives the terminal uplink signal received from the terminal station by diversity reception, MIMO reception, or the like. Therefore, the link budget with the terminal station can be improved.

Furthermore, according to the above-described embodiments, the mobile relay station can collectively transmit the data received and accumulated from the plurality of terminal stations with high quality in a short time at a timing at which communication with the base station is possible.

According to the embodiments described above, the mobile relay station stores and accumulates information of the reception signal waveform without demodulating the wireless terminal uplink signal received from the terminal station, and wirelessly transmits the reception signal waveform information to the base station at a communicable timing. The base station performs reception processing such as demodulation and decoding on the terminal uplink signal represented by the reception signal waveform in the mobile relay station. Therefore, the non-reproduction relay scheme that does not depend on the communication scheme can be applied to the wireless communication system using the low earth orbit satellite. In addition, since the non-reproduction relay is performed, the mobile relay station does not need to implement a wireless communication scheme used for the terminal station. For example, even when a terminal station that performs communication using a new wireless communication scheme is added, it is only required to make a change to add the wireless communication scheme to the base station installed on the ground without the need to make a change to the mobile relay station. Therefore, it is possible to simultaneously accommodate various IoT systems, and it is also possible to easily cope with the update of the IoT system. In addition, since the large Doppler shift received by each terminal station can be performed by the base station without being processed by the mobile relay station, it is not necessary to implement a complicated nonlinear operation for compensating for the Doppler shift in the mobile relay station.

Note that, in the above embodiments, the case where the moving object on which the mobile relay station is mounted is an LEO satellite has been described. However, the moving object may be another flying object flying the sky, such as a geostationary orbit satellite, a drone, or an HAPS.

According to the above-described embodiments, the wireless communication device (apparatus) includes a transmission unit, a timing control unit, a distance calculation unit, and an output control unit. For example, the wireless communication device is the terminal station 3 in the embodiment, the transmission unit is the transmission unit 32 and the antenna 33 in the embodiment, the timing control unit is the timing control unit 351 in the embodiment, the distance calculation unit is the distance calculation unit 352 in the embodiment, and the output control unit is the output control unit 353 in the embodiment.

The transmission unit transmits a signal to another wireless communication device mounted on the moving object. For example, the other wireless communication device is the mobile relay stations 2, 2*a*, and 2*b* in the embodiment, and the signal is the terminal uplink signal in the embodiment. The timing control unit starts transmission of a signal by the transmission unit at a timing at which communication with another wireless communication device is possible. The distance calculation unit acquires orbit information indicating a geocentric orbit of the moving object and self-position information indicating a self-position to calculate a positional relationship between the self-position and a position of the moving object at the timing on the basis of the orbit information and the self-position information. For example, the orbit information is the orbit information 312 in the embodiment, and the self-position information is the self-position information 313 in the embodiment. The output control unit controls the transmission output of the signal by the transmission unit according to the positional relationship.

Note that the distance calculation unit may calculate a positional relationship indicating a distance between the self-position and the position of the moving object. In this case, the output control unit may control the transmission output to be smaller as the distance is shorter.

Note that the distance calculation unit may calculate a positional relationship indicating an elevation angle from the self-position to the moving object. In this case, the output control unit may control the transmission output to be smaller as the elevation angle is larger.

In addition, according to the above-described embodiments, the wireless communication system includes a first wireless communication device, a relay device mounted on a moving object, and a second wireless communication device. For example, the first wireless communication device is the terminal station 3 in the embodiment, the relay device is the mobile relay stations 2, 2*a*, and 2*b* in the embodiment, and the second wireless communication device is the base stations 4, 4*a*, and 4*b* in the embodiment.

The first wireless communication device includes a first signal transmission unit (a first signal transmitter), a timing control unit (a timing controller), a distance calculation unit (a distance calculator), and an output control unit (an output controller). For example, the first signal transmission unit is the transmission unit 32 and the antenna 33 in the embodiment, the timing control unit is the timing control unit 351 in the embodiment, the distance calculation unit is the distance calculation unit 352 in the embodiment, and the output control unit is the output control unit 353 in the embodiment.

The first signal transmission unit transmits a first signal to the relay device. For example, the first signal is a terminal uplink signal in the embodiment. The timing control unit starts transmission of the first signal by the transmission unit at a timing at which communication with the relay device is possible. The distance calculation unit acquires orbit information indicating a geocentric orbit of the moving object and self-position information indicating a self-position to calculate a positional relationship between the self-position and a position of the moving object at the timing on the basis of the orbit information and the self-position information.

For example, the orbit information is the orbit information 312 in the embodiment, and the self-position information is the self-position information 313 in the embodiment. The output control unit controls the transmission output of the first signal by the transmission unit according to the positional relationship.

The relay device includes a first signal reception unit (a first signal receiver), a storage unit (a storage), and a second signal transmission unit (a second signal transmitter). For example, the first signal reception unit is the reception units 221 and 221b in the embodiment, the storage unit is the data storage unit 23 in the embodiment, and the second signal transmission unit is the base station communication units 24 and 26 in the embodiment. The first signal reception unit receives the first signal transmitted by the first wireless communication device. The storage unit stores waveform data indicating the waveform of the first signal received by the first signal reception unit. The second signal transmission unit transmits the second signal indicating the waveform data stored in the storage unit to the second wireless communication device at a timing at which communication with the second wireless communication device is possible. For example, the second signal is a base station downlink signal in the embodiment.

The second wireless communication device includes a second signal reception unit (a second signal receiver), a second signal reception processing unit (a second signal reception processor), and a first signal reception processing unit (a first signal reception processor). The second signal reception unit receives the second signal transmitted by the relay device. For example, the second signal reception unit is the antenna 41 and the reception unit 42, and the antenna station 410 and the MIMO reception unit 420 in the embodiment. The second signal reception processing unit performs reception processing of the second signal received by the second signal reception unit to acquire waveform data. For example, the second signal reception processing unit is the base station signal reception processing unit 43 and the base station signal reception processing unit 430 in the embodiment. The first signal reception processing unit performs reception processing of the first signal indicated by the waveform data acquired by the second signal reception processing unit to acquire data set in the first signal by the first wireless communication device. The first signal reception processing unit is, for example, terminal signal reception processing units 44 and 450 in the embodiment.

The first signal reception processing unit can perform reception processing by a plurality of wireless schemes. In addition, the reception processing performed by the first signal reception processing unit includes processing for compensating for the Doppler shift received by the first signal received by the first signal reception unit.

The first signal reception unit may receive the first signal through a plurality of antennas. The storage unit stores waveform data indicating a waveform of the first signal received by each of the plurality of antennas. The reception processing performed by the first signal reception processing unit includes processing for demodulating the first signal represented by the waveform data corresponding to each of the plurality of antennas and decoding a signal obtained by combining demodulation results.

Although the embodiments of the present invention have been described in detail with reference to the drawings so far, specific configurations are not limited to these embodiments, and include designs and the like without departing from the spirit of the present invention.

The mobile relay stations 2, 2a, and 2b, the terminal station 3, and the base stations 4, 4a, and 4b in the above-described embodiments may be implemented by a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disc, a read-only memory (ROM), or a compact disc read-only memory (CD-ROM), or a storage device such as a hard disk built in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as a field programmable gate array (FPGA).

REFERENCE SIGNS LIST

1, 1a, 1b Wireless communication system
2, 2a, 2b Mobile relay station
3 Terminal station
4, 4a, 4b Base station
21, 21-1 to 21-N Antenna
22, 22b Terminal communication unit
23 Data storage unit
24, 26 Base station communication unit
25 Antenna
31 Data storage unit
32 Transmission unit
33 Antenna
34 Reception unit
35 Transmission control unit
41 Antenna
42 Reception unit
43, 430 Base station signal reception processing unit
44 Terminal signal reception processing unit
221, 221b-1 to 221b-N Reception unit
222, 222b-1 to 222b-N Reception waveform recording unit
241, 261 Storage unit
242, 262 Control unit
243, 263 Transmission data modulation unit
244 Transmission unit
264 MIMO transmission unit
311 Sensor data
312 Orbit information
313 Self-position information
314 Output control information
351 Timing control unit
352 Distance calculation unit
353 Output control unit
410 Antenna station
420 MIMO reception unit
441 Terminal signal demodulation unit
442 Terminal signal decoding unit 450 Terminal signal reception processing unit
451 Distribution unit
452-1 to 452-N Terminal signal demodulation unit
453 Combining unit
454 Terminal signal decoding unit

The invention claimed is:

1. A wireless communication device comprising:
a transmitter that transmits a signal to another wireless communication device mounted on a moving object;
a timing controller that starts transmission of the signal by the transmitter at a timing at which communication with the other wireless communication device is possible;
a distance calculator that acquires orbit information indicating a geocentric orbit of the moving object and self-position information indicating a self-position to calculate a positional relationship between the self-position and a position of the moving object at the timing based on the orbit information and the self-position information; and
an output controller that controls a transmission output of the signal by the transmitter according to the positional relationship.

2. The wireless communication device according to claim 1, wherein
the distance calculator calculates the positional relationship indicating a distance between the self-position and the position of the moving object.

3. The wireless communication device according to claim 2, wherein
the output controller controls the transmission output to be smaller as the distance is shorter.

4. The wireless communication device according to claim 1, wherein
the distance calculator calculates the positional relationship indicating an elevation angle from the self-position to the moving object.

5. The wireless communication device according to claim 4, wherein
the output controller controls the transmission output to be smaller as the elevation angle is larger.

6. A wireless communication system comprising a first wireless communication device, a relay device mounted on a moving object, and a second wireless communication device, wherein
the first wireless communication device includes:
a first signal transmitter that transmits a first signal to the relay device;
a timing controller that starts transmission of the first signal by the first signal transmitter at a timing at which communication with the relay device is possible;
a distance calculator that acquires orbit information indicating a geocentric orbit of the moving object and self-position information indicating a self-position to calculate a positional relationship between the self-position and a position of the moving object at the timing based on the orbit information and the self-position information; and
an output controller that controls a transmission output of the first signal by the first signal transmitter according to the positional relationship,
the relay device includes:
a first signal receiver that receives the first signal transmitted by the first wireless communication device;
a storage that stores waveform data indicating a waveform of the first signal received by the first signal receiver; and a second signal transmitter that transmits a second signal indicating the waveform data stored in the storage to the second wireless communication device at a timing at which communication with the second wireless communication device is possible, and
the second wireless communication device includes:
a second signal receiver that receives the second signal transmitted by the relay device;
a second signal reception processor that performs reception processing of the second signal received by the second signal receiver to acquire the waveform data; and
a first signal reception processor that performs reception processing of the first signal indicated by the waveform data acquired by the second signal reception processor to acquire data set in the first signal by the first wireless communication device.

7. The wireless communication system according to claim 6, wherein
the distance calculator calculates the positional relationship indicating a distance between the self-position and the position of the moving object.

8. The wireless communication system according to claim 7, wherein
the output controller controls the transmission output to be smaller as the distance is shorter.

9. The wireless communication system according to claim 6, wherein
the distance calculator calculates the positional relationship indicating an elevation angle from the self-position to the moving object.

10. The wireless communication system according to claim 9, wherein
the output controller controls the transmission output to be smaller as the elevation angle is larger.

11. The wireless communication system according to claim 6, wherein
the first signal reception processor is capable of the reception processing by a plurality of wireless schemes.

12. The wireless communication system according to claim 6, wherein
the reception processing performed by the first signal reception processor includes processing for compensating for a Doppler shift received by the first signal received by the first signal receiver.

13. The wireless communication system according to claim 6, wherein
the first signal receiver receives the first signal through a plurality of antennas,
the storage stores waveform data indicating a waveform of the first signal received by each of the plurality of antennas, and
the reception processing performed by the first signal reception processor includes processing for demodulating the first signal indicated by the waveform data corresponding to each of the plurality of antennas and decoding a signal obtained by combining demodulation results.

14. The wireless communication system according to claim 6, wherein
the relay device is provided in a low earth orbit satellite, and
the first wireless communication device and the second wireless communication device are installed on the earth.

15. A wireless communication method comprising:

a transmission step of transmitting a signal to another wireless communication device mounted on a moving object;

a timing control step of starting transmission of the signal in the transmission step at a timing at which communication with the other wireless communication device is possible;

a distance calculation step of acquiring orbit information indicating a geocentric orbit of the moving object and self-position information indicating a self-position to calculate a positional relationship between the self-position and a position of the moving object at the timing based on the orbit information and the self-position information; and an output control step of controlling a transmission output of the signal in the transmission step according to the positional relationship.

16. A wireless communication method that is executed by a wireless communication system including a first wireless communication device, a relay device mounted on a moving object, and a second wireless communication device, the wireless communication method comprising:

a first signal transmission step of transmitting, by the first wireless communication device, a first signal to the relay device;

a timing control step of starting, by the first wireless communication device, transmission of the first signal in the first signal transmission step at a timing at which communication with the relay device is possible;

a distance calculation step of acquiring, by the first wireless communication device, orbit information indicating a geocentric orbit of the moving object and self-position information indicating a self-position to calculate a positional relationship between the self-position and a position of the moving object at the timing based on the orbit information and the self-position information;

an output control step of controlling, by the first wireless communication device, a transmission output of the first signal in the first signal transmission step according to the positional relationship;

a first signal reception step of receiving, by the relay device, the first signal transmitted by the first wireless communication device;

a storage step of storing, by the relay device, waveform data indicating a waveform of the first signal received in the first signal reception step;

a second signal transmission step of transmitting, by the relay device, a second signal indicating the waveform data stored in the storage step to the second wireless communication device at a timing at which communication with the second wireless communication device is possible;

a second signal reception step of receiving, by the second wireless communication device, the second signal transmitted by the relay device;

a second signal reception processing step of performing, by the second wireless communication device, reception processing of the second signal received in the second signal reception step to acquire the waveform data; and a first signal reception processing step of performing, by the second wireless communication device, reception processing of the first signal indicated by the waveform data acquired in the second signal reception processing step to acquire data set in the first signal by the first wireless communication device.

17. A non-transitory computer-readable recording medium storing a program for causing a computer to execute processes as a wireless communication device, the processes comprising:

transmitting a signal to another wireless communication device mounted on a moving object;

starting transmission of the signal in the transmitting at a timing at which communication with the other wireless communication device is possible;

acquiring orbit information indicating a geocentric orbit of the moving object and self-position information indicating a self-position to calculate a positional relationship between the self-position and a position of the moving object at the timing based on the orbit information and the self-position information; and controlling a transmission output of the signal in the transmitting according to the positional relationship.

* * * * *